(12) United States Patent
Tsunehara (10) Patent No.: US 6,959,971 B2
(45) Date of Patent: Nov. 1, 2005

(54) VEHICLE BRAKING APPARATUS

(75) Inventor: Hiroshi Tsunehara, Atsugi (JP)

(73) Assignee: Nissan Motor Co., Ltd., Kanagawa (JP)

(*) Notice: Subject to any disclaimer, the term of this patent is extended or adjusted under 35 U.S.C. 154(b) by 43 days.

(21) Appl. No.: 10/659,381

(22) Filed: Sep. 11, 2003

(65) Prior Publication Data

US 2004/0090116 A1 May 13, 2004

(30) Foreign Application Priority Data

Nov. 8, 2002 (JP) ........................................ 2002-325432

(51) Int. Cl.[7] ................................................ B60T 8/64
(52) U.S. Cl. ............................ 303/152; 303/3; 303/15
(58) Field of Search ............................. 303/3, 15, 152, 303/16, 17, 189, 20, 115.2; 188/106 P (56) References Cited

U.S. PATENT DOCUMENTS

| | | | |
|---|---|---|---|
| 5,362,135 A | * | 11/1994 | Riddiford et al. .............. 303/3 |
| 5,472,264 A | | 12/1995 | Klein et al. |
| 5,511,859 A | * | 4/1996 | Kade et al. ................. 303/152 |
| 5,539,641 A | * | 7/1996 | Littlejohn .................... 701/70 |
| 5,573,312 A | * | 11/1996 | Muller et al. .................. 303/3 |
| 5,615,933 A | | 4/1997 | Kidston et al. |
| 5,707,115 A | * | 1/1998 | Bodie et al. .................... 303/3 |
| 6,099,089 A | | 8/2000 | Schneider |
| 6,488,344 B2 | * | 12/2002 | Huls et al. .................. 303/152 |

FOREIGN PATENT DOCUMENTS

| | | |
|---|---|---|
| JP | 05-161211 A | 6/1993 |
| JP | 2002-067909 A | 3/2002 |

* cited by examiner

*Primary Examiner*—Melanie Torres
(74) *Attorney, Agent, or Firm*—Shinjyu Global IP Counselors, LLP (57) ABSTRACT

A vehicle braking apparatus is provided that basically comprises a hydraulic braking apparatus, an electric braking apparatus and a regenerative braking apparatus. The hydraulic braking apparatus is configured and arranged to apply a hydraulic braking force on at least one first wheel subject to a first braking system. The electric braking apparatus is configured and arranged to apply an electric braking force on at least one second wheel subject to a second braking system that is different from the first braking system. The regenerative braking apparatus is configured and arranged to apply a regenerative braking force on one of the first and second wheels subject to a corresponding one of the first and second braking systems. The vehicle braking apparatus enables the battery for an electric braking apparatus to be more compact while also enabling regenerated electric power to be used for braking.

21 Claims, 9 Drawing Sheets

VEHICLE BRAKING APPARATUS

BACKGROUND OF THE INVENTION

1. Field of the Invention

The present invention generally relates to a vehicle braking apparatus that applies a braking force to the wheels of a vehicle.

2. Background Information

An example of a conventional vehicle braking apparatus is disclosed in Japanese Laid-Open Patent Application No. 05-161211 that uses two different types of braking devices for an electric vehicle. In particular, this publication discloses using a hydraulic brake apparatus having four hydraulic braking devices to apply a braking force to each of the wheels of the vehicle and an electric drive motor that acts as a regenerative brake apparatus to apply a braking force to the rear wheels of the vehicle. In this conventional vehicle braking apparatus, a controller selectively operates the hydraulic brake devices and the regenerative braking of the electric drive motor in depending on operating conditions. Thus, the hydraulic brake apparatus selectively operates on all four wheels, while the regenerative braking only operates on the rear wheels.

Another example of a conventional vehicle braking apparatus is disclosed in Japanese Laid-Open Patent Application No. 2002-067909 that uses two different types of braking devices in parallel. In particular, this publication discloses using a hydraulic brake device to apply a braking force to a pair of front wheels of a vehicle and an electric brake device to apply a braking force to a pair of rear wheels of the vehicle. In this conventional vehicle braking apparatus that uses a hydraulic brake device in parallel with an electric brake device, the hydraulic brake device is used for the front wheels, which are subject to a first system, and the electric brake device is used for the rear wheels that are subject to a second system that is different from the first system.

In view of the above, it will be apparent to those skilled in the art from this disclosure that there exists a need for an improved vehicle braking apparatus. This invention addresses this need in the art as well as other needs, which will become apparent to those skilled in the art from this disclosure.

SUMMARY OF THE INVENTION

It has been discovered that in the abovementioned conventional vehicle braking apparatus that uses regenerative braking in parallel with hydraulic braking, that the regenerated electric power cannot be used for braking. Specifically, the hydraulic brake devices are operated on the non-driven wheel side and the drive wheel side, while the regenerative brake apparatus is operated only on the drive wheel side. Therefore, the regenerated electric power can be used for driving, but not for braking.

On the other hand, in the abovementioned conventional vehicle braking apparatus that uses a pair of hydraulic brake devices in parallel with a pair of electric brake devices, the hydraulic brake devices are used for the front wheels, which are subject to a first system, and the electric brake devices are used for the rear wheels that are subject to a second system, different than the first system. Therefore, this configuration requires the addition of a dedicated battery or the use of a battery larger than the existing battery in order to supply the electric power consumed by the electric brakes. Moreover, energy losses occur from the charging and discharging of the battery. These efficiency-related losses waste power (energy), which leads to the need for an even larger battery to offset those energy losses.

Accordingly, to advantageously solve the abovementioned problems, and from the perspective of taking measures for the environment and fuel economy, an object of the present invention is to implement a vehicle braking apparatus that can reduce the size of the battery for the electric brake, and that can use regenerated electric power for braking.

In view of the above, a vehicle braking apparatus of the present invention is provided that basically comprises a hydraulic braking apparatus, an electric braking apparatus and a regenerative braking apparatus. The hydraulic braking apparatus includes a first hydraulic braking device that is configured and arranged to apply a hydraulic braking force on at least one first wheel subject to a first braking system. The electric braking apparatus includes a first electric braking device that is configured and arranged to apply an electric braking force on at least one second wheel subject to a second braking system that is different from the first braking system. The regenerative braking apparatus includes a first regenerative braking device that is configured and arranged to apply a regenerative braking force on one of the first and second wheels subject to a corresponding one of the first and second braking systems.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
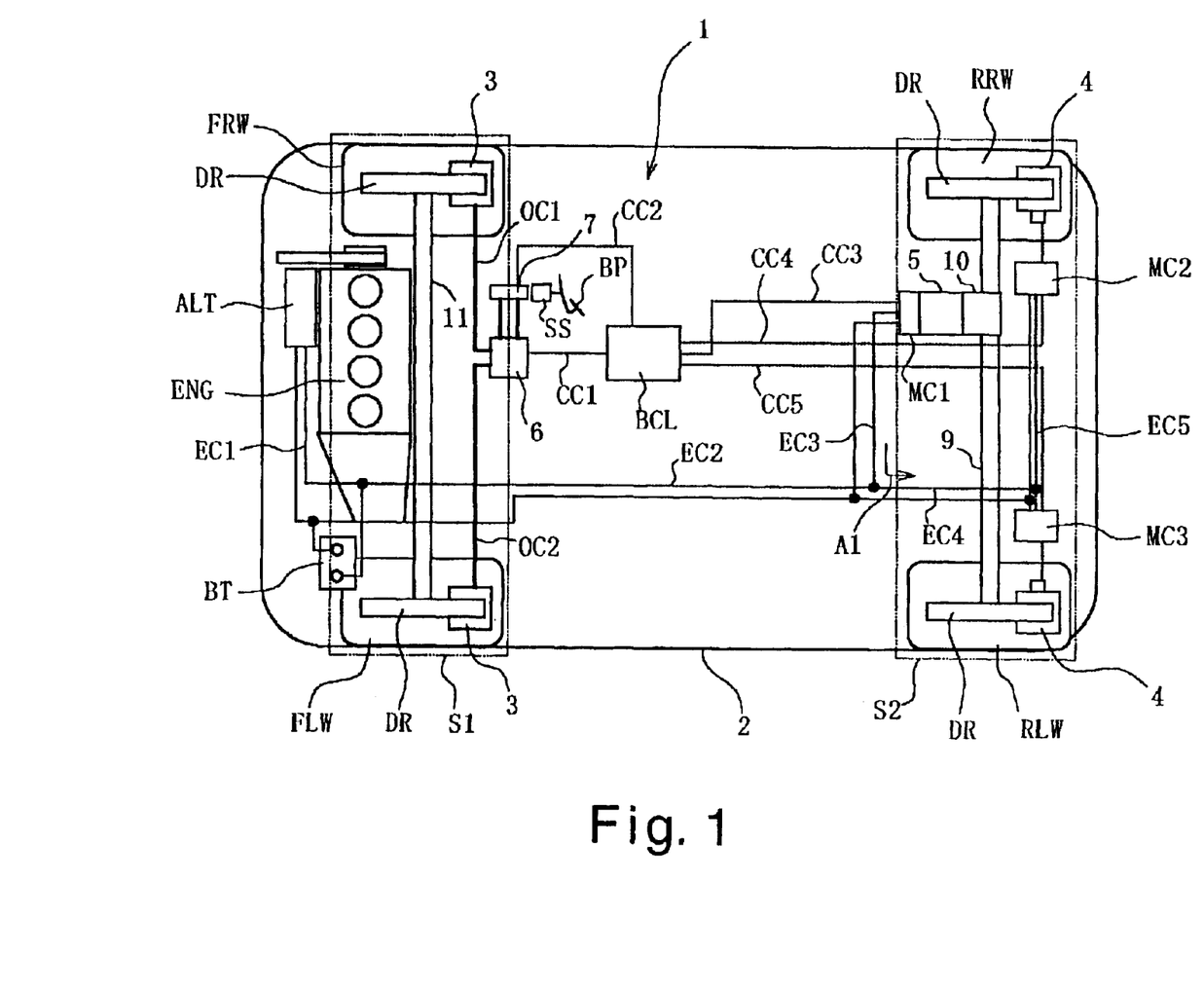
FIG. 1 is a schematic block diagram of a vehicle equipped with a motor vehicle braking apparatus according to a first embodiment of the present invention.

Referring initially to FIG. 1, a motor vehicle braking apparatus 1 is diagrammatically illustrated in accordance with a first embodiment of the present invention. FIG. 1 is a system block diagram of a motor vehicle 2 with the motor vehicle braking apparatus 1 according to the first embodiment of the present invention.

Preferably, the motor vehicle braking apparatus 1 of the present embodiment is installed in the motor vehicle 2 (front-engine, front-wheel drive vehicle) which is a front-wheel drive vehicle in which two front wheels FRW and FLW are driven only by a gasoline internal combustion engine ENG. The motor vehicle braking apparatus stops or slows the motor vehicle 2 by applying a braking force to a plurality of wheels FRW, FLW, RRW and RLW (herein, four wheels) by a plurality of braking systems. The motor vehicle braking apparatus 1 comprises a pair of hydraulic brakes 3, a pair of electric brakes 4, a regenerative brake 5 and a hydraulic actuator 6 that supplies hydraulic pressure to the hydraulic brakes 3.

In this embodiment, the hydraulic brakes 3 forms part of a hydraulic braking apparatus that forms a first braking system S1. The electric brakes 4 forms part of an electric braking apparatus that forms a part of a second braking system S2. The regenerative brake 5 forms part of a regenerative braking apparatus that forms a part of the second braking system S2. Thus, the electric brakes 4 and the regenerative brake 5 are part of the same braking system S2. The braking systems S1 and S2 are independent systems that are individually operable relative to each other. However, the brake systems S1 and S2 are operated such that the sum of the individual braking forces of the brake systems S1 and S2 is equal to a required (total) braking force requested by the driver. The term "brake system" as used herein refers to one or more braking devices or apparatuses that applies a braking force on the same wheel.

The hydraulic brakes 3 are operatively coupled to the front wheels FRW and FLW for braking each of the front wheels FRW and FLW. Thus, the front wheels FRW and FLW are subject to the first braking system S1 among the abovementioned plurality of braking systems, and obtain a braking force by hydraulic pressure.

The electric brakes 4 are operatively coupled to the rear wheels RRW and RLW for braking each of the rear wheels RRW and RLW. Thus, the rear wheels RRW and RLW are subject to the electric brakes 4 which are part of the second braking system S2, among the abovementioned plurality of braking systems. The second braking system S2 is different from the first braking system S1, and obtains a braking force by an electric actuator.

The regenerative brake 5 is operatively coupled to the rear wheels RRW and RLW for braking each of the rear wheels RRW and RLW, and obtains a braking force by regeneration. Thus, the rear wheels RRW and RLW are subject to the regenerative brake 5 which is part of the second braking system S2, among the abovementioned plurality of braking systems.

The hydraulic brakes 3 are conventional components that are well known in the art. Since hydraulic brakes are well known in the art, the hydraulic brakes 3 will not be discussed or illustrated in detail herein. Likewise, the electric brakes 4 are conventional components that are well known in the art. Since electric brakes are well known in the art, the electric brakes 4 will not be discussed or illustrated in detail herein. Preferably, the hydraulic brakes 3 and the electric brakes 4 are disc brakes as discussed later.

In addition, the regenerative brake 5 is a relatively conventional component that is well known in the art. Since regenerative brakes are well known in the art, the regenerative brake 5 will not be discussed or illustrated in detail herein. Preferably, the regenerative brake 5 uses an electric motor that is configured and arranged to act as a generator by applying a load to the rear wheels RRW and RLW. Preferably, the regenerative brake 5 has an inverter that converts the load applied to the rear wheels RRW and RLW to electricity when braking. Alternatively, in this embodiment, when the regenerative brake 5 can be selectively operated as an electric motor to provide a rotational driving force to the rear wheels RRW and RLW when the vehicle is in a four wheel drive mode. However, normally, the rear wheels RRW and RLW are non-driving wheels and the regenerative brake 5 merely supplies a braking load to the rear wheels RRW and RLW.

Figure 2:
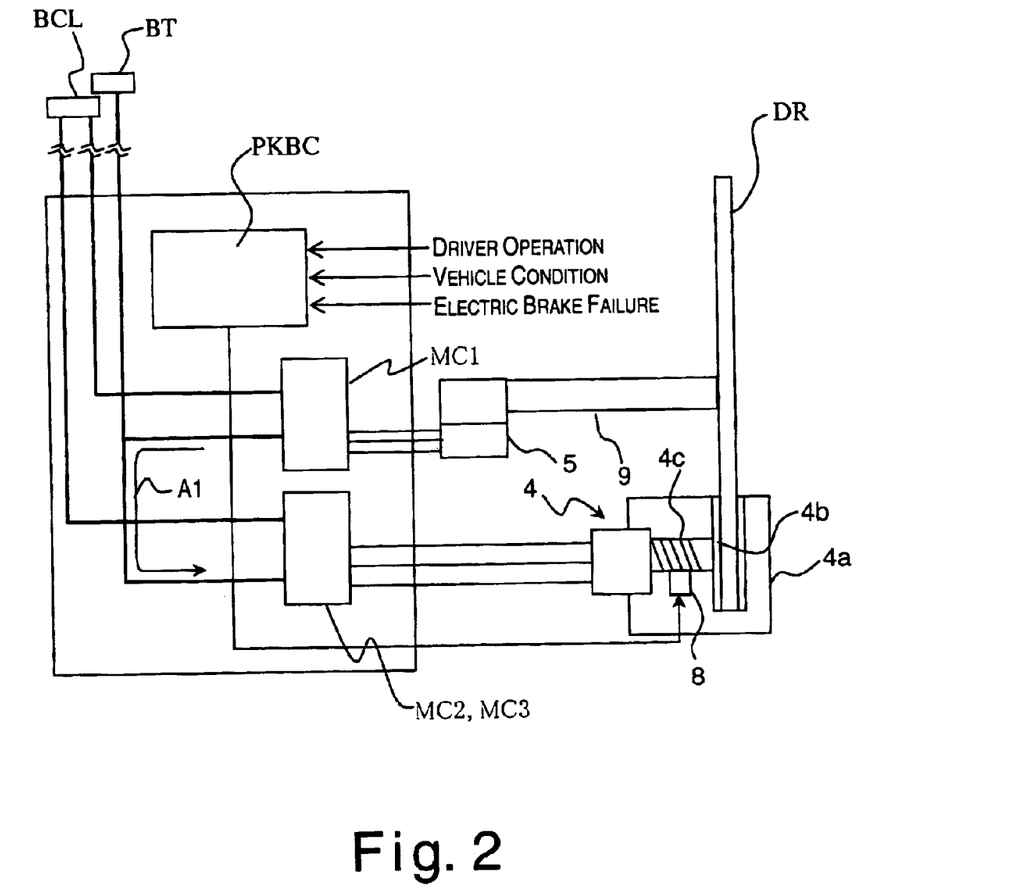
FIG. 2 is a partial enlarged schematic diagram of a latch mechanism provided with an electric brake in the first embodiment of the present invention.

Furthermore, the motor vehicle braking apparatus 1 of the present embodiment includes a brake controller BCL, a plurality (three) of motor controllers MC1, MC2 and MC3, and a parking brake controller PKBC, as shown in FIG. 2 (discussed later). The brake controller BCL serves as the control unit for the motor vehicle braking apparatus 1. The brake controller BCL preferably includes a microcomputer with a control program that controls the braking as discussed below. The brake controller BCL can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for brake controller BCL can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The brake controller BCL executes a control program on the basis of various input information, and determines a target regenerative braking force (torque) to be produced by the regenerative braking device, a target hydraulic braking force (torque) to be produced by the hydraulic braking device, and an electric braking force (torque) to be produced by the electric braking device. These target braking forces are based on a required braking force for the entire vehicle as determined by the depression amount of the brake pedal BP. Thus, the sum of these target braking forces is equal to the required braking force for the entire vehicle. Thus, the required braking forces by the brakes 3, 4 and 5 are controlled by the brake controller BCL to obtain the required braking force for the entire vehicle.

In the first embodiment of the present invention, the hydraulic brakes 3 are operatively coupled to the right and left front wheels FRW and FLW, which are the drive wheels. The hydraulic brakes 3 apply braking forces to the wheels FRW and FLW by pressing brake pads (not shown) to the disc rotors DR by operating calipers (not shown), which operate in response to the hydraulic pressure from the hydraulic actuator 6. Further, the hydraulic brakes 3 provided in the right front wheel FRW and the left front wheel FLW are connected to the hydraulic actuator 6 by a pair of hydraulic circuits OC1 and OC2, respectively. In addition, the hydraulic pressure is supplied to the hydraulic actuator 6 herein from a master cylinder 7, which is linked to a brake pedal BP. The hydraulic pressure is generated in accordance with the depression of the brake pedal BP, and a signal that indicates the generation of hydraulic pressure is sent to the brake controller BCL via a control circuit CC1. Further, the brake pedal BP is provided with a stroke sensor SS that is configured and arranged to sense the amount of operation of the brake pedal BP. The amount of depression of the brake pedal BP detected by the stroke sensor SS is sent from a control circuit CC2 to the brake controller BCL.

The regenerative brake 5 is operatively configured and arranged on a non-driving axle 9, which is coupled to the right rear wheel RRW and the left rear wheel RLW. The regenerative brake 5 is coupled to the non-driving axle 9 via a differential gear 10, which comprises a gear train that includes a reduction gear. The regenerative brake 5 is controlled by the abovementioned motor controller MC1. Further, a control circuit CC3 connects the motor controller MC1 and the brake controller BCL. Thereby, the signal from the brake controller BCL, which corresponds to the depression of the brake pedal BP, is sent via the control circuit CC3 to the motor controller MC1 for controlling the regenerative brake 5.

Each of the electric brakes 4 includes a caliper 4a, a pair of brake pads 4b and an electrically operating screw shaft 4c (only one of the electric brakes 4 is illustrated in FIG. 2). Thus, the motors of the electric brakes 4 are controlled by the motor controllers MC2 and MC3 to operate the calipers 4a and the electrically operating screw shafts 4c. The screw shafts 4c press the brake pads 4b against the disc rotors DR to obtain the required braking forces in response to the operation of the calipers 4a and the electrically operating screw shafts 4c. Further, the arrangement of the electric brake 4 shown in FIG. 2 is provided in each of the right and left rear wheels RRW and RLW, which are follower or non-driven wheels. In addition, two control circuits CC4 and CC5 connect the motor controllers MC2 and MC3 of the rear wheels RRW and RLW and the brake controller BCL as seen in FIG. 1. Thereby, a signal from the brake controller BCL, which corresponds to the depression of the brake pedal BP, is sent via the control circuits CC4 and CC5 to the motor controllers MC2 and MC3 for the respective right and left rear wheels RRW and RLW.

Furthermore, each of the electric brakes 4 is further configured and arranged with a latch mechanism 8 that serves as a parking brake device. Preferably, the latch mechanism 8 latches the screw shaft 4c in order to maintain the pressed state of the brake pads 4b against the disc rotor DR. The operation of the latch mechanism 8 is electrically controlled by the parking brake controller PKBC.

If the parking brake controller PKBC detects the operation of the parking brake, etc., by the driver, or a vehicle state excluding operation by the driver (e.g., a failure of the electric brake 4), or the like, then the parking brake controller PKBC outputs a control signal to the latch mechanism 8 in accordance with that detected signal.

In addition, the motor controller MC1 for the regenerative brake 5 and the motor controllers MC2 and MC3 for the electric brakes 4 of the right and left rear wheels RRW and RLW are interconnected by a plurality of electric circuits EC1, EC2, EC3, EC4 and EC5. The electric circuits EC1, EC2, EC3, EC4 and EC5 connect the motor controllers MC1, MC2 and MC3 to an alternator ALT and a battery BT. The electric circuits EC3, EC4 and EC5 among these electric circuits comprise a pathway (electric circuit EC3→electric circuit EC4→electric circuit EC5) for supplying regenerated electric power in order to directly supply the electric power regenerated by the regenerative brake 5 from the regenerative brake 5 to the electric brake 4, as shown by an arrow A1 in FIG. 1.

If the brake pedal BP in the motor vehicle braking apparatus 1 of the first embodiment as discussed above is depressed, the hydraulic actuator 6 is supplied with hydraulic pressure from the master cylinder 7, which is linked to the brake pedal BP. The hydraulic pressure is then generated corresponding to the depression of the brake pedal BP. In addition, the amount of operation of the brake pedal BP (depression amount) by the driver depressing the brake pedal BP is detected by the stroke sensor SS. The stroke sensor SS produces a signal of that detected depression amount is sent from the stroke sensor SS via the control circuit CC2 to the brake controller BCL.

From among the abovementioned operations, the hydraulic pressure generated by the hydraulic actuator 6 is supplied via the hydraulic circuits OC1 and OC2 to each of the hydraulic brakes 3 provided in the right front wheel FRW and the left front wheel FLW. The brake pads (not shown) are pressed against the disc rotor DR by the hydraulic pressure from that hydraulic actuator 6, and a braking force is thereby applied to each of the right and left front wheels FRW and FLW (drive wheels).

In addition, from among the abovementioned operations, the signal of the detected depression amount of the brake pedal BP sent to the brake controller BCL is also sent via the control circuits CC3, CC4, and CC5 to the motor controller MC1 for controlling the regenerative brake 5 and the motor controllers MC2 and MC3 for controlling the electric brakes 4. Further, the regenerative brakes 5 are operated by the control of the motor controller MC1 that received that signal, and that operation applies a braking force to each of the right and left rear wheels RRW and RLW (non-driven wheels) and regenerates electric power when braking. The electric power generated by the regenerative brake 5 due to that regeneration is supplied via the electric circuits EC3, EC4 and EC5 to the motor controllers MC2 and MC3, as shown by the arrow A1 in FIG. 1. Thereby, the motor controllers MC2 and MC3 operate the electric brakes 4 by controlling the electric power in accordance with the signal received from the brake controller BCL, and a braking force is thereby applied to each of the right and left rear wheels RRW and RLW (non-driven wheels). Furthermore, if, by the operation of the accelerator pedal (not shown), the pressure on that accelerator pedal is released, then the braking force due to the engine brake is naturally applied.

In other words, according to the motor vehicle braking apparatus 1 of the present embodiment, the electric brakes 4 consume electric power, due to the operation thereof, when braking. At the same time, the regenerative brake 5 also regenerates electric power, due to the operation thereof, when braking. Consequently, the electric power regenerated by the regenerative brake 5 is supplied to the electric brakes 4 from the electric circuits EC3, EC4 and EC5 (pathway for supplying regenerated electric power). If excess electrical power is generated by the regenerative brake 5 in excess of the amount required by the electric brakes 4, then the regenerative brake 5 charges the battery BT.

Accordingly, the electric power regenerated by the regenerative brake 5 can be used for braking, and the losses related to the charging and discharging efficiencies of the battery BT can also be prevented. Thereby, the regenerated electric power can be effectively utilized, and the battery BT for the electric brakes 4 can be made relatively compact. Moreover, because the electric brakes 4 and the regenerative brake 5 are configured and arranged for braking the right and left rear wheels RRW and RLW (non-driven wheels), which are subject to the same second braking system S2, routing of the wiring between the electric brakes 4 and the regenerative brake 5 is simplified, and electric power losses can also be reduced.

Furthermore, when the electric brakes 4 are operating, if the consumed electric power of the electric brakes 4 is smaller than the regenerated electric power obtained by the regenerative brake 5, then the remaining electric power is stored or consumed by another electrical load. On the other hand, if the electric power consumed by the electric brakes 4 is larger than the regenerated electric power obtained by the regenerative brake 5, then the regenerated electric power shortfall is supplied from the battery BT or the alternator ALT. In addition, when the regenerative brake 5 is operating during conditions other then when the electric brakes 4 are operating, then the regenerated electric power obtained by the regenerative brake 5 is stored in the battery BT or the like, or is consumed by another electrical load.

Accordingly, because an electric power supply-demand relationship can be made between the electric brakes 4 and the regenerative brake 5, the energy losses when charging and discharging can be reduced, and the regenerated electric power can be effectively utilized.

Moreover, the motor vehicle braking apparatus 1 of the present embodiment as described above is provided with a pathway (electric circuit EC3→electric circuit EC4→electric circuit EC5) for supplying regenerated electric power in order to directly supply the electric power regenerated by the regenerative brake 5 directly to the electric brakes 4. Thereby, the electric power regenerated by the regenerative brake 5 when braking can be supplied as is, to the electric brakes 4. Accordingly, by directly connecting the electric brakes 4 and the regenerative brake 5 by using, for example, a harness that constitutes a pathway for supplying regenerated electric power, the regenerated electric power can be supplied directly to the electric brakes 4 without first storing the regenerated electric power in the battery BT. Consequently, losses due to the battery BT are reduced, the battery BT is made more compact and, therefore, it is also possible to achieve a batteryless design.

Moreover, in the motor vehicle braking apparatus 1 of the present embodiment, the electric brake 4 is provided with the latch mechanism 8 that maintains the braking force. Thereby, the operation of the latch mechanism 8 along with the electric brake 4 can be electronically controlled by the brake controller BCL, and therefore, various types of parking brake control can be performed, such as providing assistance when starting from a stop up an inclined road. In addition, such electronic control can control the operation of the latch mechanism 8 in accordance with the vehicle state. For example, if the driver has forgotten to release the parking brake, then the parking brake controller PKBC can detect the vehicle state (e.g., gear position, accelerator depression, etc.) and perform control so that the latching of the screw shaft 4c by the latch mechanism 8 is released automatically, thereby controlling the generation of heat by the latch mechanism 8.

Moreover, the parking brake controller PKBC and the motor controllers MC2 and MC3 of the electric brakes 4 can be constituted as an integrated control unit, thereby enabling space conservation and cost reduction.

In addition, in the motor vehicle braking apparatus 1 of the present embodiment, the regenerative brake 5 used for the right and left rear wheels RRW and RLW (non-driven wheels) is linked to the non-driving axle 9. Therefore, the regenerative brake 5 can be mounted without providing a new apparatus, such as a clutch that connects and disconnects the regenerative brake 5 to and from an engine ENG. Moreover, in the present embodiment, the regenerative brake 5 and the non-driving axle 9 are connected via the differential gear 10. Therefore, the relationship formed between the rotational speed characteristic of the regenerative brake 5 and the tire radius of the motor vehicle 2 can be adjusted to appropriate characteristics.

In addition, in the motor vehicle braking apparatus 1 of the present embodiment, the hydraulic brakes 3 are used for each of the right and left front wheels FRW and FLW, and therefore, among the electric brakes 4 and the hydraulic brakes 3, the output of the hydraulic brakes 3 can be increased with no increase in size, thus enabling the entire system to be made more compact.

In addition, even if the electronic control system should fail, the hydraulic brake 3 will not be affected. A larger braking force is also obtained by arranging the hydraulic brakes 3 on the front wheels FRW and FLW rather than on the rear wheels RRW and RLW because the load on the front wheels is larger when braking. This arrangement is advantageous from the perspective of safety.

Second Embodiment

Figure 3:
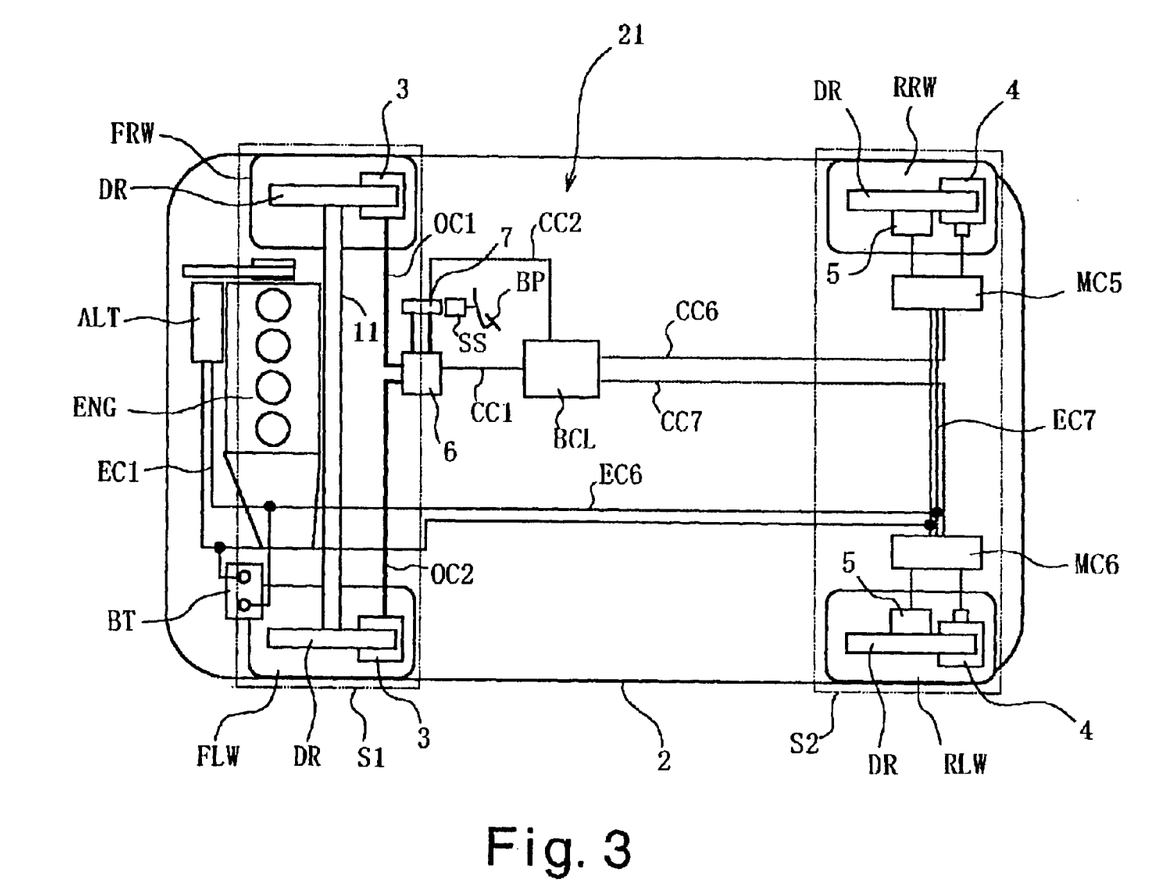
FIG. 3 is a schematic block diagram of a vehicle equipped with a motor vehicle braking apparatus according to a second embodiment of the present invention.
Figure 4:
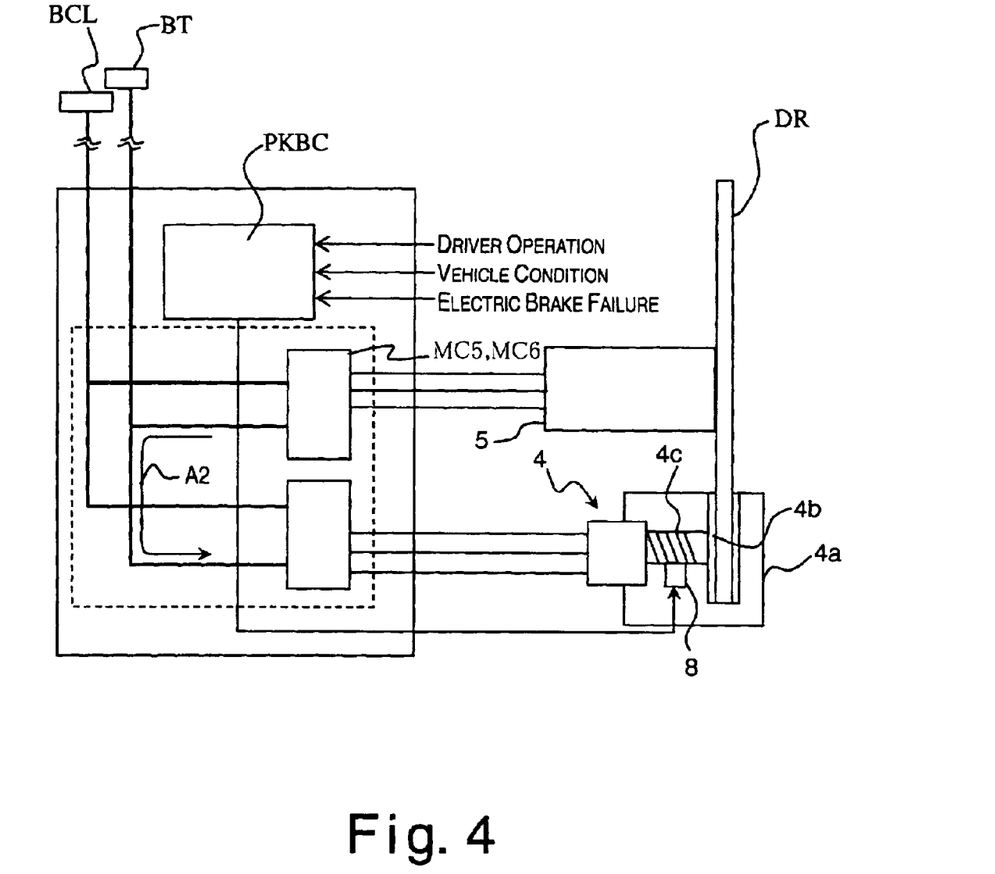
FIG. 4 is a partial enlarged schematic diagram of a latch mechanism provided with an electric brake in the second embodiment of the present invention.

Referring now to FIGS. 3 and 4, a vehicle braking apparatus 21 in accordance with a second embodiment will now be explained. In view of the similarity between the first and second embodiments, the parts of the second embodiment that are identical to the parts of the first embodiment will be given the same reference numerals as the parts of the first embodiment. Thus, the descriptions of the parts of the second embodiment that are identical to the parts of the first embodiment may be omitted for the sake of brevity.

FIG. 3 is a system block diagram that shows the motor vehicle braking apparatus 21 according to the second embodiment of the vehicle braking apparatus of the present invention. The motor vehicle braking apparatus 1 of the first embodiment is constituted so that a single regenerative brake 5 in common with the right and left rear wheels RRW and RLW is linked to the differential gear 10. However, the motor vehicle braking apparatus 21 of the second embodiment is constituted by independently providing two of the regenerative brakes 5, one on each of the right and left rear wheels RRW and RLW.

In other words, the second embodiment uses two regenerative brakes 5, and which are supported by the same wheel axle 9 (non-driving axle, which is not shown) for applying a regenerative braking force on the right and left rear wheels RRW and RLW (non-driven wheels), respectively. As shown in FIG. 4, the disc rotor DR and the regenerative brake 5 are directly coupled to each of the right and left rear wheels RRW and RLW. In addition, the electric brakes 4 are used for each of the right and left rear wheels RRW and RLW, which are subject to the abovementioned second system S2, which is the same configuration as in the abovementioned first embodiment. Furthermore, the motor vehicle braking apparatus 21 of the second embodiment is provided with two motor controllers MC5 and MC6 in place of the three motor controllers MC1, MC2 and MC3 in the first embodiment.

Similar to the first embodiment, the motor vehicle braking apparatus 21 of the second embodiment is provided with the brake controller BCL which serves as the control apparatus, and the parking brake controller PKBC.

In the second embodiment, the electric brakes 4 and the regenerative brakes 5 provided the right and left rear wheels RRW and RLW are controlled by the abovementioned motor controllers MC5 and MC6. Control circuits CC6 and CC7 connect these motor controllers MC5 and MC6 and the brake controller BCL. Thereby, a signal from the brake controller BCL corresponding to the depression of the brake pedal BP is sent via the control circuits CC6 and CC7 to the motor controllers MC2 and MC3 for controlling the electric brakes 4 and the regenerative brakes 5 of the right and left rear wheels RRW and RLW, respectively.

In addition, the electric brakes 4 of the second embodiment are each provided with the latch mechanism 8 as a parking brake device, which is the same as the electric brakes 4 used in the previous first embodiment. Herein, the latch mechanism 8 latches the screw shaft 4c for holding the pressed state of the disc rotor DR by the brake pads 4b provided in the caliper 4a, as shown in FIG. 4. The latch mechanism 8 is electrically controlled by the motor controllers MC5 and MC6 as well as by the operation of the parking brake controller PKBC, which is configured in the control apparatus.

In addition, as shown in FIG. 3, the alternator ALT, the battery BT, and the motor controllers MC5 and MC6 are connected by electric circuits EC1, EC6 and EC7. These motor controllers MC5 and MC6 constitute a regenerated electric power supply pathway for directly supplying electric power regenerated by the regenerative brakes 5, when braking, from the regenerative brakes 5 to the electric brakes 4, as shown by the arrow A2 in FIG. 4.

According to the motor vehicle braking apparatus 21 of the present second embodiment as described above, the regenerative brakes 5 are independently provided in each of the right and left rear wheels RRW and RLW, and the braking forces due to regeneration of each right and left rear wheels RRW and RLW can be separately controlled. Consequently, by separately controlling the regenerative braking forces in accordance with the amount of slip of each rear wheels RRW and RLW so that the regenerative braking forces are smaller than the amount of operation by the driver, the regenerative brakes 5 can control the braking forces based on the vehicle's state. Accordingly, in addition to obtaining an effect the same as in the previous first embodiment, the regenerative brakes 5 can perform various types of braking control based on the vehicle's state, e.g., antilock brake system (ABS) and vehicle dynamics control (VDC) if for example, there is a large amount of slip when braking.

As an example of controlling the braking forces based on the abovementioned vehicle state, behavior control of the vehicle can be implemented by, for example, varying the regenerative braking forces in response to the operation of the brake pedal BP by the driver if the behavior of the vehicle has deviated. Consequently, as an example of a control method other than the control methods described above, braking forces control can be implemented by a system wherein two wheel axles are separately controlled even if the braking force is small, as with electronic brake force distribution (EBD) control and the so-called limited slip differential (LSD) braking in which control is performed by limiting braking by applying a braking force differential to a pair of drive axles. Moreover, because regenerated electric power can be obtained while implementing such braking force control, fuel economy can also be improved.

Third Embodiment

Figure 5:
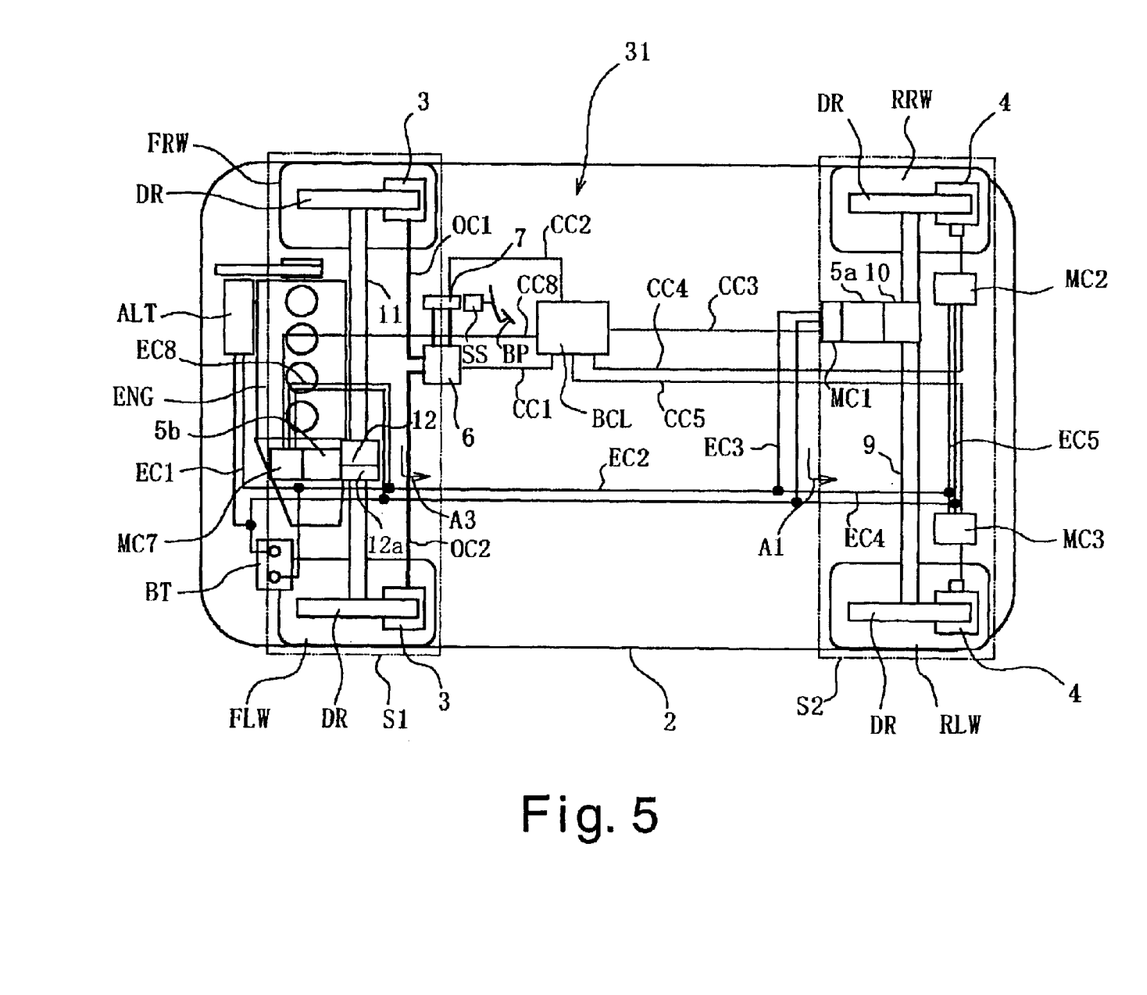
FIG. 5 a schematic block diagram of a vehicle equipped with a motor vehicle braking apparatus according to a third embodiment of the present invention.

Referring now to FIG. 5, a vehicle braking apparatus 31 in accordance with a third embodiment will now be explained. In view of the similarity between the third embodiment and the prior embodiments, the parts of the third embodiment that are identical to the parts of the prior embodiments will be given the same reference numerals as the parts of the prior embodiments. Moreover, the descriptions of the parts of the third embodiment that are identical to the parts of the prior embodiments may be omitted for the sake of brevity.

FIG. 5 is a system block diagram that shows the motor vehicle braking apparatus 31 according to the third embodiment of the vehicle braking apparatus of the present invention. The motor vehicle braking apparatus 31 of the present third embodiment includes all of the features of the motor vehicle braking apparatus 1 of the first embodiment, except that the single regenerative brake 5 has been replaced with a rear regenerative brake 5a and a front a regenerative brake 5b. The regenerative brake 5a basically corresponds to the regenerative brake 5 illustrated in FIG. 1. The regenerative brake 5a is operatively coupled to the non-driving axle 9, while the regenerative brake 5b that is operatively coupled to a drive axle 11. The regenerative brakes 5a and 5b function as independent regenerative braking apparatuses that apply braking by regenerative forces. The regenerative brake 5b is used for braking the right and left front wheels FRW and FLW which are subject to the first braking system S1. The regenerative brake 5a is used for braking the right and left front wheels RRW and RLW which are subject to the second braking system S2.

The abovementioned regenerative brake 5b is disengagably linked between the drive axle 11 and the engine ENG. Preferably, the regenerative brake 5b is linked to the drive axle 11 via a differential gear 12, which is provided with a clutch 12a that connects and disconnects the motor shaft of the regenerative brake 5b to and from the drive axle 11. Further, a control circuit CC8 connects a motor controller MC7 of the rear wheels RRW and RLW and the brake controller BCL. Thereby, a signal from the brake controller BCL corresponding to the depression of the brake pedal BP is sent via the control circuit CC8 to the motor controller MC7 for the regenerative brake 5b to use for braking the front wheels FRW and FLW. In addition, the motor controller MC7 is connected via an electric circuit EC8 to the electric circuit EC2.

In addition to the effects obtained by the constitution of the abovementioned first embodiment, the motor vehicle braking apparatus 31 of the third embodiment as discussed above supplies electric power to the electric brakes 4 that are used for the right and left rear wheels RRW and RLW, from the electric power regenerated by the regenerative brake 5a (linked to the non-driving axle 9) as well as the electric power regenerated by the regenerative brake 5b (linked to the drive axle 11), as shown by the arrows A1 and A3 in FIG. 5, when braking occurs due to the operations of the regenerative brakes 5a and 5b. Thereby, the amount of regenerated electric power from the regenerative brakes 5a and 5b can be increased relative to the first embodiment.

Moreover, when a braking force is applied to the front wheels FRW and FLW (drive wheels) in the present embodiment, the regenerative brake 5b is linked to the drive axle 11 via the differential gear 12, which functions as a reduction gear without directly coupling to the engine ENG. Consequently, if directly coupled to the engine ENG, it is possible to prevent the unfortunate loss of the ability to regenerate electric power when in the idling range, and electric power can be regenerated by the regenerative brake 5b even when at low speeds. Furthermore, the connection of the regenerative brake 5b to the engine ENG is disengagable, and is preferably linked on the side of the drive axle 11, as previously discussed. The connection of the regenerative brake 5b to the engine ENG can also be directly linked, for example, to the end part of the drive axle 11 via the differential gear 12.

Incidentally, if the regenerative brake 5b is directly coupled to the engine ENG, braking by regeneration cannot be performed in the low vehicle speed range in order to prevent the engine stalling. In addition, taking the motor characteristics of the regenerative brake into consideration, a larger torque (braking force) can be generated at a low rotational speed than at a high rotational speed. Further, this indicates that, the lower the speed, braking by regeneration can be performed over a large deceleration range (large braking force range). In addition, it is generally known that the frequency of travel at relatively low speeds is high when traveling in urban areas. Thus, when traveling in urban areas, efficiency is unfortunately degraded because the regenerative brake, which is directly coupled to the engine ENG, cannot recover most of the electric power from regeneration.

In contrast, as discussed previously, according to the construction of the present third embodiment, the regenerative brake 5b is linked via the differential gear 12 to the drive axle 11 without direct coupling to the engine ENG. Thus, a braking force due to regeneration can be generated by the regenerative brake 5 up until immediately before the motor vehicle stops, and a large amount of regenerated electric power can be efficiently recovered. Moreover, the differential gear 12 has a clutch that connects and disconnects the drive axle 11 to and from the motor shaft of the regenerative brake 5b. Therefore, the relationship between the rotational speed characteristics of the regenerative brake 5b and the tire radius of the motor vehicle can be adjusted to appropriate characteristics. Thereby, it is possible to implement the characteristics of the regenerated motor force and the regenerated electric power in accordance with the travel conditions of the motor vehicle 2 (maximum speed, speed distribution, etc.).

Moreover, because the regenerative brake 5b and the drive axle 11 are coupled, it is possible, immediately before the motor vehicle 2 stops, to generate a braking force by the regenerative brake 5b, even at a low speed, by generating a torque (drive force) in the reverse direction. Thereby, it is possible to reduce the load of the hydraulic brakes 3 and the electric brakes 4, since in this embodiment, the hydraulic brakes 3 and the regenerative brake 5b both apply to the wheels of the drive axle 11. Therefore the entirety is made more compact and lighter in weight.

Moreover, in the present embodiment, the regenerative brake 5 and the drive axle 11 are coupled by the engaging of the differential gear 12, and there is no need to degrade acceleration performance or increase fuel consumption.

In other words, there is no need to continuously couple the regenerative brake 5b to the drive axle 11, and sufficient regenerated electric power can be obtained at relatively low speeds, even if the engine ENG and the regenerative brake 5b are coupled (compatible with the fuel cutoff when the engine ENG is decelerating). Therefore, the fuel consumption of the engine ENG is not increased. This is also because it is conceivable that the acceleration performance and fuel consumption will degrade due to the effect of the inertial mass when the regenerative brake 5b is directly coupled to the drive axle 11 even during acceleration. Therefore, the regenerative brake 5b and the drive axle 11 should be in a coupled state at relatively low speeds.

Furthermore, in addition to the method of providing, as in the present embodiment, a clutch between the regenerative brake 5b and the drive axle 11, and connecting and disconnecting the coupling therebetween, the object of the present embodiment can be achieved even with, for example, a switching mechanism such as a clutch that connects and disconnects the coupling between the engine ENG and the drive axle 11. In addition, the object of the present embodiment can be achieved even with a mechanism that sets the wheel axle to an engaged state by the meshing of gears by utilizing a wedge effect, such as a mechanism that can engage the drive axle 11 only when braking and not in response to the vehicle speed Fourth Embodiment Referring now to FIG. 6, a vehicle braking apparatus 41 in accordance with a fourth embodiment will now be explained. In view of the similarity between the fourth embodiment and the prior embodiments, the parts of the fourth embodiment that are identical to the parts of the prior embodiments will be given the same reference numerals as the parts of the prior embodiments. Moreover, the descriptions of the parts of the fourth embodiment that are identical to the parts of the prior embodiments may be omitted for the sake of brevity.

Figure 6:
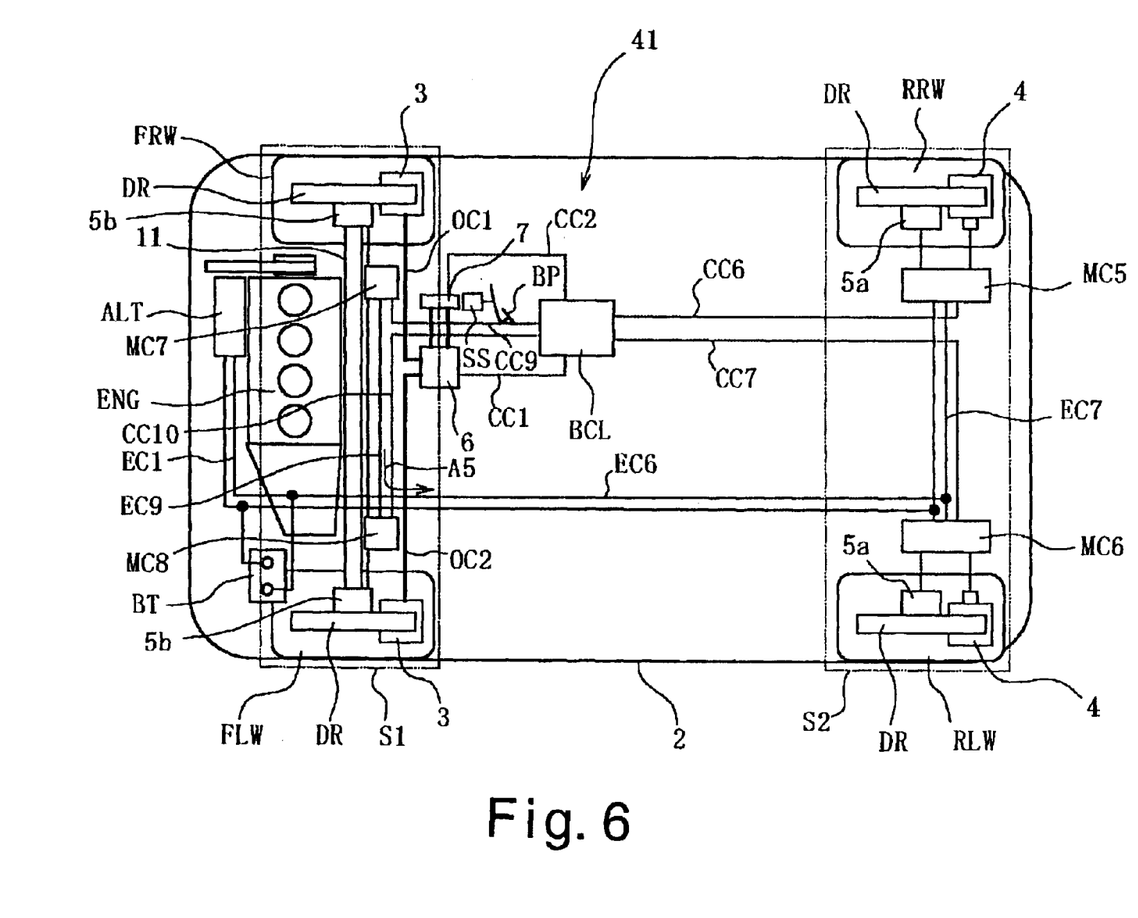
FIG. 6 is a schematic block diagram of a vehicle equipped with a motor vehicle braking apparatus according to a fourth embodiment of the present invention.

FIG. 6 is a system block diagram that shows the motor vehicle braking apparatus 41 according to the fourth embodiment of the vehicle braking apparatus of the present invention. The motor vehicle braking apparatus 41 of the present embodiment is similar to the motor vehicle braking apparatus 21 of the previous second embodiment shown in FIG. 3, except that the regenerative brakes 5 has been replaced with a pair of rear regenerative brakes 5a and a pair of front regenerative brakes 5b. In this embodiment of FIG. 6, the regenerative brakes 5a are operatively linked to the non-driving axle 9, and the regenerative brakes 5b are operatively linked to the drive axle 11.

The regenerative brakes 5b function as regenerative braking apparatuses that obtain a braking force by regeneration. The regenerative brakes 5b are used for the right and left front wheels FRW and FLW, which are subject to the first braking system S1. The regenerative brakes 5b are configured and arranged so that the regenerative brakes 5b are independently operable for independent applying a braking force to a corresponding one of the right and left front wheels FRW and FLW.

In the present embodiment, the motor controllers MC7 and MC8 control the regenerative brakes 5b used for braking the right and left front wheels FRW and FLW (drive wheels), respectively. Further, control circuits CC9 and CC10 connect these motor controllers MC7 and MC8 and the brake controller BCL. Thereby, a signal from the brake controller BCL corresponding to the depression of the brake pedal BP is sent via the control circuits CC9 and CC10 to the motor controllers MC7 and MC8 for controlling the regenerative brakes 5b of the right and left front wheels FRW and FLW, respectively. Further, the motor controllers MC7 and MC8 are connected via an electric circuit EC9 to the electric circuit EC6.

In addition, in the present embodiment, electric circuits EC1, EC6, EC7 and EC9 connect the alternator ALT, the battery BT, the motor controllers MC7 and MC8 for the regenerative brakes 5b of the right and left front wheels FRW and FLW, and the motor controllers MC5 and MC6 for the electric brakes 4 and the regenerative brakes 5a provided in the right and left rear wheels RRW and RLW. Among these electric circuits, electric circuits EC9, EC6 and EC7 constitute a pathway (electric circuit EC9→electric circuit EC6→electric circuit EC7) for supplying regenerated electric power in order to directly supply the electric power regenerated by the regenerative brakes 5b from the regenerative brakes 5b to the electric brakes 4, as shown by an arrow A5 in FIG. 6.

Figure 7:
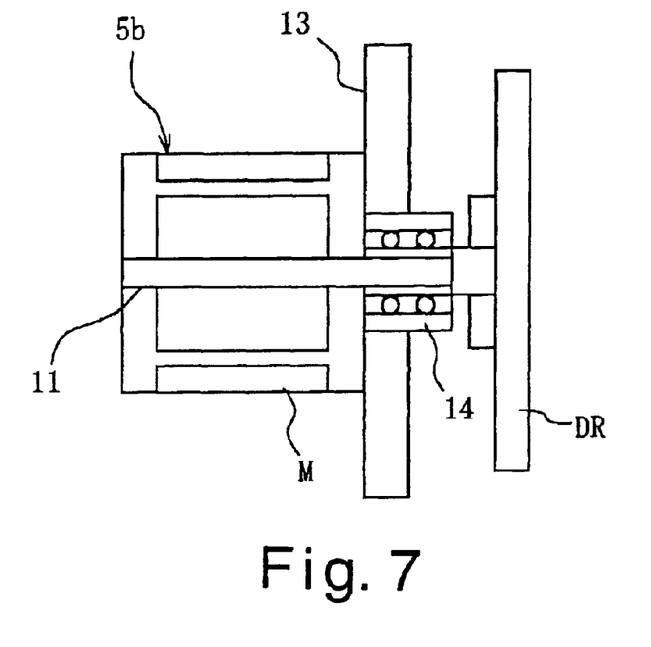
FIG. 7 is an explanatory diagram of one example of a mounting structure for mounting the regenerative brake of the motor vehicle braking apparatus to the drive wheel according to the present invention.

Referring now to FIG. 7, a schematic diagram is illustrated that shows one example of a mounting structure for mounting each of the regenerative brakes 5b, provided by the motor vehicle braking apparatus 41 of the fourth embodiment, to a corresponding one of the right and left front wheels FRW and FLW (drive wheels). The present mounting structure is constituted so that the regenerative brakes 5b are directly coupled to the drive axle 11, which is coupled to the front wheels FRW and FLW (drive wheels). In other words, the disc rotors DR are preferably linked to the drive axle 11. Each axle housing 13 is rotatably supported by the drive axle 11 via an axle bearing 14. A motor M of the regenerative brake 5b supported by the drive axle 11 regenerates electric power corresponding to the rotation of the front wheels FRW and FLW.

According to the motor vehicle braking apparatus 41 of the fourth embodiment, the regenerative brakes 5b are independently provided in each of the right and left front wheels FRW and FLW (drive wheels). Therefore, in addition to the effects obtained by the previous second embodiment, a regenerative braking force can be generated without the operation of the brake by the driver. For example, if drive slip occurs, then a conventional traction control system (TCS) can be implemented in which the regenerative brakes 5b are individual operated to control slippage. Furthermore, conventional, general vehicle behavior control can be implemented by varying the regenerative braking force in response to the operation of the brake pedal BP by the driver if the vehicle behavior deviates. As an example of a control method other than the control methods described above, braking force control can be implemented by a system wherein a pair of wheel axles are separately controlled even if the braking force is small, as with electronic brake force distribution (EBD) control and the so-called limited slip differential (LSD) braking in which control is performed by limiting braking by applying a braking force differential to a pair of drive axles. Moreover, because regenerated electric power can be obtained while implementing such braking force control, fuel economy can also be improved.

Moreover, when the regenerative brakes 5b are directly coupled to the engine ENG and electric power can no longer be regenerated in the idling rotational speed range, the regenerative brakes 5b are linked to the drive axle 11, thus enabling electric power to be regenerated even in the low speed range (idling rotational speed range).

Figure 8:
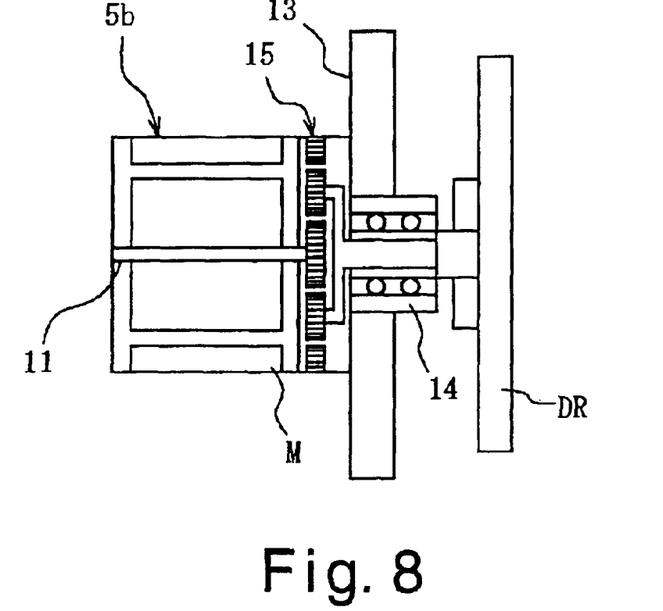
FIG. 8 is an explanatory diagram that shows one example of a mounting structure for mounting the regenerative brake of the motor vehicle braking apparatus to the drive wheel according to the present invention.

Furthermore, it is acceptable for the mounting structure of each regenerative brake 5b in the present embodiment to link the drive axle 11 and the motor M of the regenerative brake 5b via a planetary gear transmission 15, which functions as a transmission, as shown in FIG. 8. According to such a mounting structure, after passing through the planetary gear transmission 15 between the drive axle 11 and the regenerative motor M of the regenerative brake 5b, the relationship formed between the rotational speed characteristics of the regenerative brake 5 and the tire radius of the motor vehicle 2 can be adjusted to appropriate characteristics.

Fifth Embodiment

Figure 9:
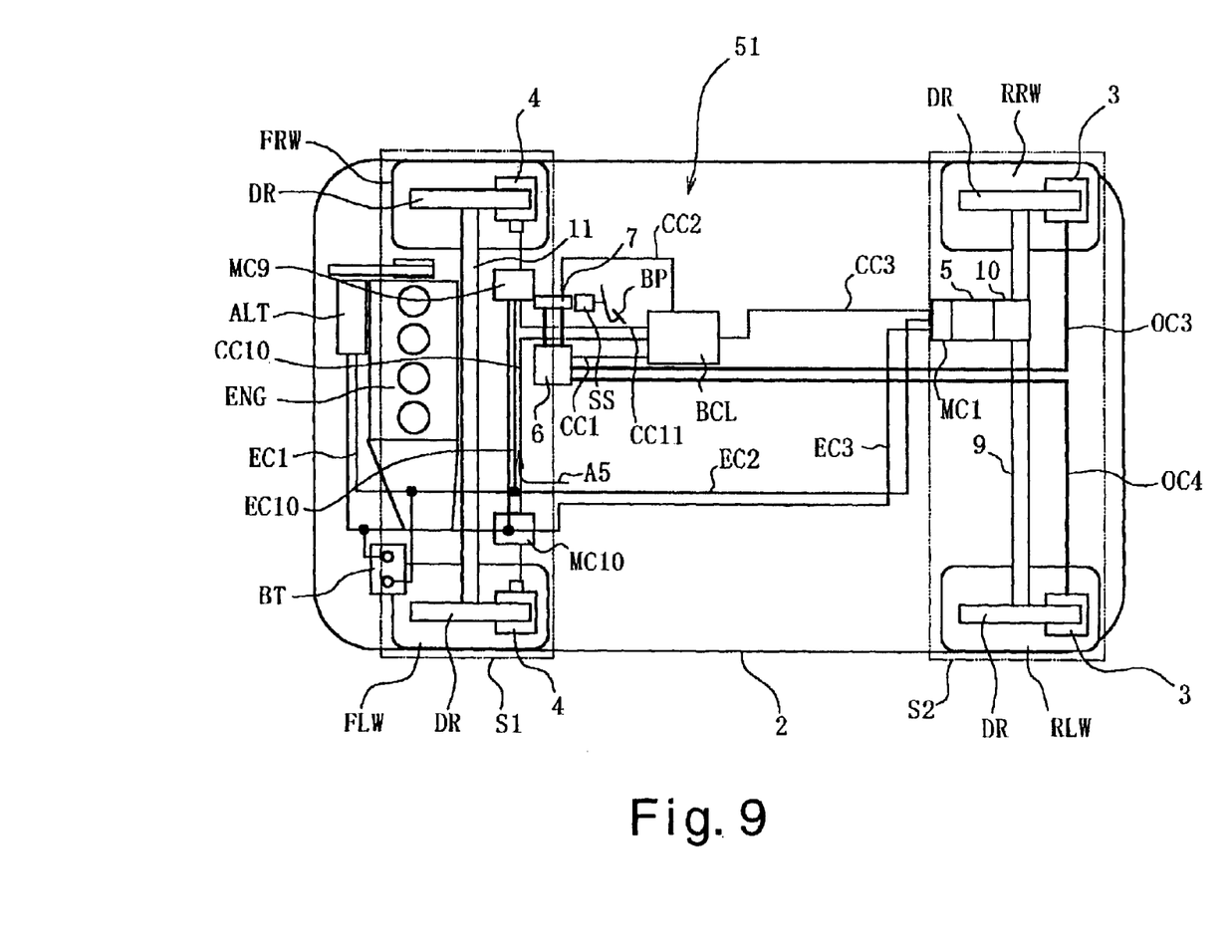
FIG. 9 is a schematic block diagram of a vehicle equipped with a motor vehicle braking apparatus according to a fifth embodiment of the present invention.

Referring now to FIG. 9, a vehicle braking apparatus 51 in accordance with a fifth embodiment will now be explained. In view of the similarity between the fifth embodiment and the prior embodiments, the parts of the fifth embodiment that are identical to the parts of the prior embodiments will be given the same reference numerals as the parts of the prior embodiments. Moreover, the descriptions of the parts of the fifth embodiment that are identical to the parts of the prior embodiments may be omitted for the sake of brevity.

FIG. 9 is a system block diagram that shows the motor vehicle braking apparatus 51 according to the fifth embodiment of the vehicle braking apparatus of the present invention. The motor vehicle braking apparatus 51 of the fifth embodiment is has the electric brakes 4 arranged and configured for braking the right and left front wheels FRW and FLW, which are subject to the first braking system S1. The electric brakes 4 function as electric braking apparatuses that obtain a braking force by electric actuators. The hydraulic brakes 3 are arranged and configured for braking the right and left rear wheels RRW and RLW, which are subject to the second braking system S2. The hydraulic brakes 3 function as hydraulic brake apparatuses that obtain a braking force by hydraulic pressure. The regenerative brake 5 is arranged and configured for braking the rear wheels RRW and RLW, and functions as a regenerative braking apparatus that applies a braking force by regenerated power.

Similar to the previous first embodiment, the hydraulic brakes 3 of the fifth embodiment are operatively coupled to the right and left rear wheels RRW and RLW (non-driven wheels) to apply braking forces to the wheels by pressing brake pads (not shown) to disc rotors DR in response to the operation of calipers (not shown) by the hydraulic pressure from the hydraulic actuator 6. Further, hydraulic circuits OC3 and OC4 respectively connect the hydraulic brakes 3 provided in the right and left rear wheels RRW and RLW to the hydraulic actuator 6.

In addition, motor controllers MC9 and MC10 control the electric brakes 4 of the present embodiment. Further, control circuits CC11 and CC12 connect these motor controllers MC9 and MC10 and the brake controller BCL. Thereby, a signal from the brake controller BCL corresponding to the depression amount of the brake pedal BP is sent via the control circuits CC11 and CC12 to the motor controllers MC9 and MC10 for controlling the electric brakes 4 of the right and left front wheels FRW and FLW, respectively.

Furthermore, electric circuits EC1, EC10 and EC 11 connect the alternator ALT, the battery BT, the motor controller MC1 for the regenerative brake 5, and the motor controllers MC9 and MC10 for controlling the electric brakes 4 provided in the right and left front wheels FRW and FLW. The electric circuits EC10 and EC11 among these electric circuits constitute a pathway (electric circuit EC11→electric circuit EC10) for supplying regenerated electric power in order to directly supply the electric power regenerated by the regenerative brake 5 from the regenerative brake 5 to the electric brakes 4, as shown by the arrow A5 in FIG. 8.

According to the motor vehicle braking apparatus 51 of the fifth embodiment as discussed above, the battery BT for the electric brakes 4 can be made compact, in the same manner as in the previous first embodiment. In addition, in consideration of the position at which the alternator ALT, the battery BT, the electric brakes 4, and the regenerative brake 5 are installed in the vehicle, and factors such as the routing of the wiring of a harness and the like used to connect those components, the constitution of the present embodiment may allow for the reduction of electric power losses. Consequently, the degrees of freedom of the arrangement of the alternator ALT, the battery BT, and the like, and the degrees of freedom of the routing of the wiring that connects those components can be increased, thus enabling a layout with a small electric power loss.

Sixth Embodiment

Figure 10:
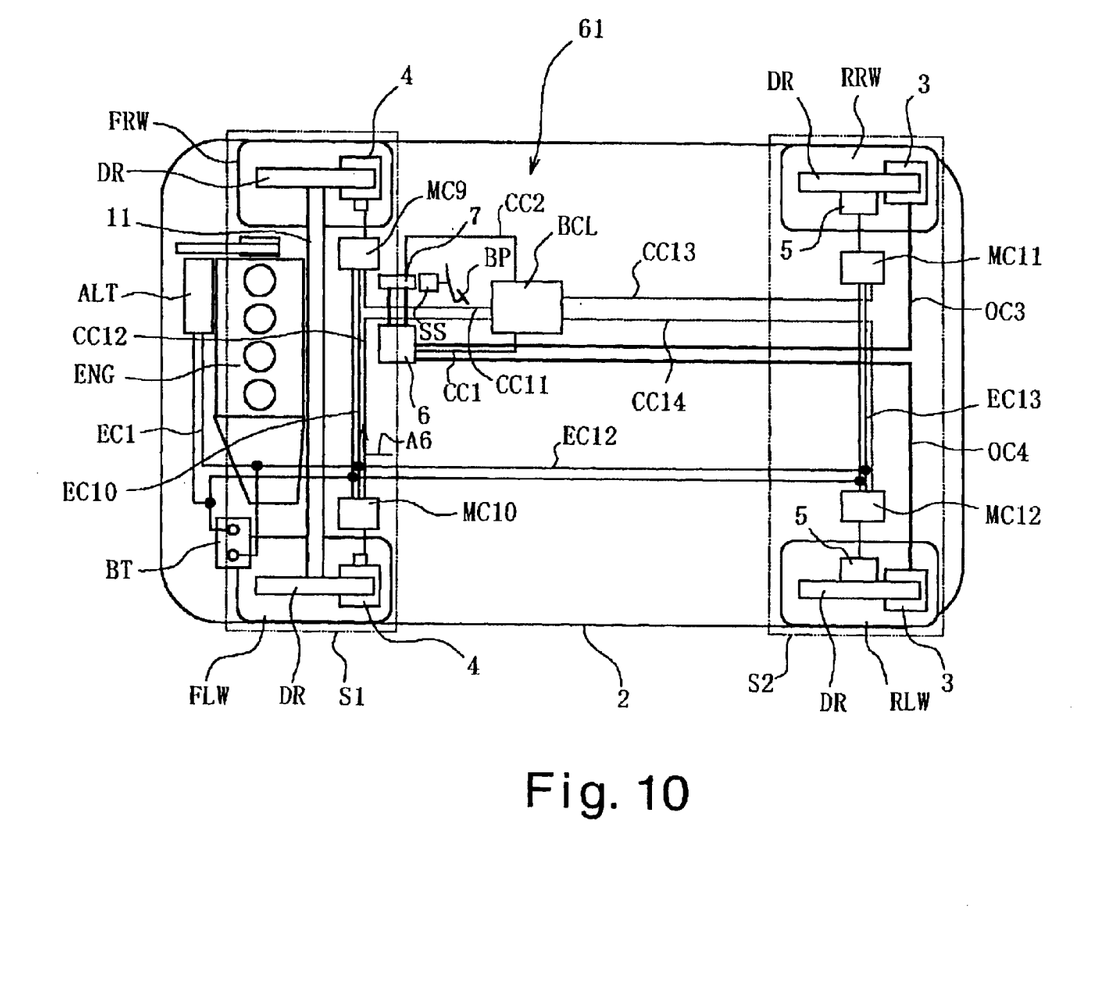
FIG. 10 a schematic block diagram of a vehicle equipped with a motor vehicle braking apparatus according to a sixth embodiment of the present invention.

Referring now to FIG. 10, a vehicle braking apparatus 61 in accordance with a sixth embodiment will now be explained. In view of the similarity between the sixth embodiment and the prior embodiments, the parts of the sixth embodiment that are identical to the parts of the prior embodiments will be given the same reference numerals as the parts of the prior embodiments. Moreover, the descriptions of the parts of the sixth embodiment that are identical to the parts of the prior embodiments may be omitted for the sake of brevity.

FIG. 10 is a system block diagram that shows the motor vehicle braking apparatus 61 according to the sixth embodiment of the vehicle braking apparatus of the present invention. The motor vehicle braking apparatus 61 of the present embodiment is substantially the same as the motor vehicle braking apparatus 51 of the previous fifth embodiment. The motor vehicle braking apparatus 61 includes a pair of wheel-in-motor type regenerative brakes 5 that are independently controllable with respect to each of the rear wheels RRW and RLW. The regenerative brakes 5 are the same as the ones provided in the rear wheels RRW and RLW of the motor vehicle braking apparatus 21 of the previous second embodiment. Furthermore, the brake controller BCL of the motor vehicle braking apparatus 61 serves as the control unit in the same manner as in the previous fifth embodiment. The brake controller BCL of the motor vehicle braking apparatus 61 includes four motor controllers MC9, MC10, MC11 and MC12 that are controlled by the brake controller BCL.

Furthermore, the abovementioned motor controllers MC11 and MC12 control the regenerative brakes 5 provided in the right and left rear wheels RRW and RLW. Control circuits CC13 and CC14 connect these motor controllers MC11 and MC12 and the brake controller BCL. Thereby, a signal from the brake controller BCL corresponding to the depression amount of the brake pedal BP is sent via the control circuits CC13 and CC14 to the motor controllers MC11 and MC12 for controlling the regenerative brakes 5 of the right and left rear wheels RRW and RLW.

In addition, electric circuits EC1, EC10, EC12 and EC13 connect the alternator ALT, the battery BT, and the motor controllers MC9 and MC10, MC11 and MC12. The electric circuits EC10, EC12 and EC13 among those electric circuits constitute a pathway (electric circuit EC13→electric circuit EC12→electric circuit EC10) for supplying regenerated electric power in order to directly supply the electric power regenerated by the regenerative brakes 5 from the regenerative brakes 5 to the electric brakes 4, as shown by an arrow A6 in FIG. 10.

According to the motor vehicle braking apparatus 61 of the sixth embodiment as discussed above, the right and left rear wheels RRW and RLW (non-driven wheels) are individually controlled by the motor controllers MC11 and MC12, respectively, in accordance with a signal sent from the brake controller BCL via the control circuits CC13 and CC14. Accordingly, in addition to obtaining the same effects of the fifth embodiment, the regenerative brakes 5 of this embodiment can implement various types of braking force control based on the vehicle state, in the same manner as in the second embodiment.

Although the above explanation was made based on the examples illustrated, the present invention is not limited to the abovementioned embodiments. For example, the abovementioned embodiments provided an explanation of a front-wheel drive motor vehicle. However, the vehicle braking apparatus of the present invention can also be applied to a rear-wheel drive vehicle or a four-wheel drive vehicle, and the like. In addition, the number of wheels is not limited to four, and the present invention can naturally be applied even with a vehicle having other than four wheels. In addition, although the abovementioned embodiments used a disc brake as the electric brake 4 and the regenerative brake 5, it is evident that even a drum-type brake could be applied to the vehicle braking apparatus of the present invention.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-325432. The entire disclosure of Japanese Patent Application No. 2002-325432 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle braking apparatus comprising:
   a hydraulic braking apparatus including a first hydraulic braking device configured and arranged to apply a first hydraulic braking force on at least one first wheel subject to a first braking system;
   an electric braking apparatus including a first electric braking device configured and arranged to apply a first electric braking force on at least one second wheel subject to a second braking system that is different from the first braking system;

a regenerative braking apparatus including a first regenerative braking device configured and arranged to apply a first regenerative braking force on one of the first and second wheels subject to a corresponding one of the first and second braking systems; and a regenerative power supply pathway configured and arranged to directly supply power regenerated by the regenerative braking apparatus to the electric braking apparatus.

2. The vehicle braking apparatus as recited in claim 1, wherein the first regenerative braking device is configured and arranged to apply the first regenerative braking force on the first wheel subject to the first braking system.

3. The vehicle braking apparatus as recited in claim 2, wherein the regenerative braking apparatus includes a second regenerative braking device that is configured and arranged to apply a second regenerative braking force on the second wheel subject to the second braking system.

4. The vehicle braking apparatus as recited in claim 3, wherein the hydraulic braking apparatus including a first hydraulic braking device configured and arranged to apply a second hydraulic braking force on an additional first wheel subject to the first braking system;

the electric braking apparatus includes a second electric braking device configured and arranged to apply a second electric braking force on an additional second wheel subject to the second braking system; and the regenerative braking apparatus includes a third regenerative braking device that is configured and arranged to apply a third regenerative braking force on the additional first wheel and a fourth regenerative braking device that is configured and arranged to apply a fourth regenerative braking force on the additional second wheel.

5. The vehicle braking apparatus as recited in ciaim 1, wherein the regenerative braking apparatus includes a second regenerative braking device that is configured and arranged to be independently operable from the first regenerative braking device to provide a second regenerative braking force to one of the first and second wheels subject to one of the first and second braking systems.

6. The vehicle braking apparatus as recited in claim 1, wherein the regenerative braking apparatus is operatively coupled to one of the first and second wheels that is disengagably linked to a drive shaft side of an engine.

7. The vehicle braking apparatus as recited in claim 1, wherein the hydraulic braking apparatus includes a second hydraulic braking device that is configured and arranged to operatively couple an additional first wheel with the first wheels being rear wheels.

8. The vehicle braking apparatus as recited in claim 7, wherein the electric braking apparatus includes a second electric braking device that is configured and arranged to operatively couple an additional second wheel with the second wheels being front wheels.

9. The vehicle braking apparatus as recited in claim 8, wherein the first regenerative braking device is configured and arranged to apply the first regenerative braking force on both of the rear wheels.

10. The vehicle braking apparatus as recited in claim 8, wherein the regenerative braking apparatus includes a second regenerative braking device that is configured and arranged to apply a second regenerative braking force on one of the rear wheels and the first regenerative braking device that is configured and arranged to apply the first regenerative braking force on the other of the rear wheels.

11. The vehicle braking apparatus as recited in claim 1, wherein the electric braking apparatus including a parking brake device that is configured and arranged to maintain a parking braking force.

12. The vehicle braking apparatus as recited in claim 1, wherein the regenerative braking apparatus is operatively coupled to one of the first and second wheels that is linked to a non-driving shaft.

13. The vehicle braking apparatus as recited in claim 1, wherein the hydraulic braking apparatus includes a second hydraulic braking device that is configured and arranged to operatively couple an additional first wheel with the first wheels being front wheels.

14. The vehicle braking apparatus as recited in claim 13, wherein the electric braking apparatus includes a second electric braking device that is configured and arranged to operatively couple an additional second wheel with the second wheels being rear wheels.

15. The vehicle braking apparatus as recited in claim 14, wherein the first regenerative braking device is configured and arranged to apply the first regenerative braking force on both of the rear wheels.

16. The vehicle braking apparatus as recited in claim 14, wherein the regenerative braking apparatus includes a second regenerative braking device that is configured and arranged to apply a second regenerative braking force on one of the rear wheels and the first regenerative braking device that is configured and arranged to apply first regenerative braking force on the other of the rear wheels.

17. The vehicle braking apparatus as recited in claim 15, wherein the regenerative braking apparatus includes a second regenerative braking device that is configured and arranged to apply a second regenerative braking force on both of the front wheels.

18. The vehicle braking apparatus as recited in claim 16, wherein the regenerative braking apparatus includes a third regenerative braking device that is configured and arranged to apply a third regenerative braking force on one of the front wheels and a fourth regenerative braking device that is configured and arranged to apply a fourth regenerative braking force on the other of the front wheels.

19. The vehicle braking apparatus as recited in claim 14, wherein the regenerative braking apparatus includes a second regenerative braking device that is configured and arranged to apply a second regenerative braking force on both of the rear wheels.

20. A vehicle braking apparatus comprising:

hydraulic braking means for applying a hydraulic braking force on at least one first wheel subject to a first braking system;

electric braking means for applying an electric braking force on at least one second wheel subject to a second braking system that is different from the first braking system; and regenerative braking means for applying a regenerative braking force on one of the first and second wheels subject to one of the first and second braking systems; and regenerative power supply means for directly supplying power regenerated by the regenerative braking means to the electric braking means via a direct pathway.

21. A method of controlling a braking apparatus comprising:

selectively applying a hydraulic braking force on at least one first wheel subject to a first braking system;

selectively applying an electric braking force on at least one second wheel subject to a second braking system that is different from the first braking system;

selectively applying a regenerative braking force using a regenerative braking apparatus on one of the first and second wheels that is subject to one of the first and second braking systems; and selectively supplying power regenerated by the regenerative braking apparatus to the electric braking apparatus through a regenerative power supply pathway that is configured and arranged to directly supply the power regenerated by the regenerative braking apparatus to the electric braking apparatus.

* * * * *